United States Patent
Thiel et al.

(10) Patent No.: US 7,114,779 B2
(45) Date of Patent: Oct. 3, 2006

(54) FITTING SYSTEM FOR A VEHICLE SEAT

(75) Inventors: Peter Thiel, Remscheid (DE); Andreas Rabbach, Solingen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/238,805

(22) Filed: Sep. 29, 2005

(65) Prior Publication Data

US 2006/0055223 A1    Mar. 16, 2006

Related U.S. Application Data

(63) Continuation of application No. PCT/EP04/02563, filed on Mar. 12, 2004.

(30) Foreign Application Priority Data

Apr. 3, 2003   (DE)   ................................. 103 15 375

(51) Int. Cl.
  *B60N 2/10*   (2006.01)
  *B60N 2/20*   (2006.01)
  *B60N 2/36*   (2006.01)
(52) U.S. Cl. .......................... 297/378.12; 297/378.14; 297/354.12; 297/354.13
(58) Field of Classification Search ........... 297/378.12, 297/354.12, 354.13
  See application file for complete search history.

(56) References Cited

U.S. PATENT DOCUMENTS

| | | | |
|---|---|---|---|
| 4,629,252 A | 12/1986 | Myers et al. ....... 297/378.12 X |
| 5,634,689 A | 6/1997 | Putsch et al. |
| 5,997,090 A | 12/1999 | Baloche et al. ............. 297/367 |
| 6,076,890 A * | 6/2000 | Yoshida et al. ........ 297/378.12 |
| 6,139,104 A * | 10/2000 | Brewer .............. 297/378.12 X |
| 6,454,354 B1 | 9/2002 | Vossmann et al. .......... 297/367 |
| 6,513,875 B1 | 2/2003 | Gray et al. ......... 297/378.12 X |
| 6,513,876 B1 | 2/2003 | Agler et al. ........ 297/378.12 X |
| 6,663,180 B1 * | 12/2003 | LeTournoux ........... 297/378.12 |
| 6,685,270 B1 * | 2/2004 | Haglund ............ 297/378.12 X |
| 6,733,076 B1 * | 5/2004 | Grable et al. ....... 297/378.12 X |
| 6,739,668 B1 * | 5/2004 | Coman et al. ......... 297/378.12 |
| 6,799,806 B1 | 10/2004 | Eppert et al. ............. 297/463.1 |
| 6,827,404 B1 * | 12/2004 | Blair et al. ............. 297/378.12 |
| 6,869,143 B1 * | 3/2005 | Secord .............. 297/378.12 X |
| 6,880,888 B1 | 4/2005 | Rabbach et al. ....... 297/378.12 |
| 6,905,173 B1 * | 6/2005 | Tame et al. ............ 297/378.12 |
| 6,910,739 B1 * | 6/2005 | Grable et al. .......... 297/378.12 |

(Continued)

FOREIGN PATENT DOCUMENTS

DE    38 28 659 A1    3/1989

(Continued)

*Primary Examiner*—Rodney B. White
(74) *Attorney, Agent, or Firm*—Womble Carlyle Sandridge & Rice, PLLC

(57) ABSTRACT

A fitting system (5) for a vehicle seat, in particular for a motor vehicle seat, for adjusting the inclination of a backrest relative to a seat part of the vehicle seat, having a first fitting (10) and a second fitting (20) arranged above and attached to the adjustment fitting (10), wherein after the first fitting (10) has been unlocked, the backrest is adjustable between various upright use positions and/or between at least one upright use position and a rearward inclined recline position, and wherein after unlocking the second fitting (20), the backrest can be adjusted between at least one upright use position and a forward-tilted table position, the first fitting (10) and the second fitting (20) being separately formed as entirely functional adjustment fittings.

20 Claims, 3 Drawing Sheets

U.S. PATENT DOCUMENTS

| | | | |
|---|---|---|---|
| 6,926,362 B1 * | 8/2005 | Kroner et al. | 297/378.12 X |
| 2004/0066079 A1 * | 4/2004 | Schwerdtner et al. | 297/378.12 |
| 2004/0090102 A1 * | 5/2004 | Tame et al. | 297/378.12 |

FOREIGN PATENT DOCUMENTS

| | | |
|---|---|---|
| DE | 44 00 911 A1 | 8/1994 |
| DE | 199 28 148 A1 | 1/2001 |
| DE | 101 05 282 A1 | 8/2002 |
| DE | 101 16 160 A1 | 10/2002 |
| FR | 2 628 371 | 9/1989 |

* cited by examiner

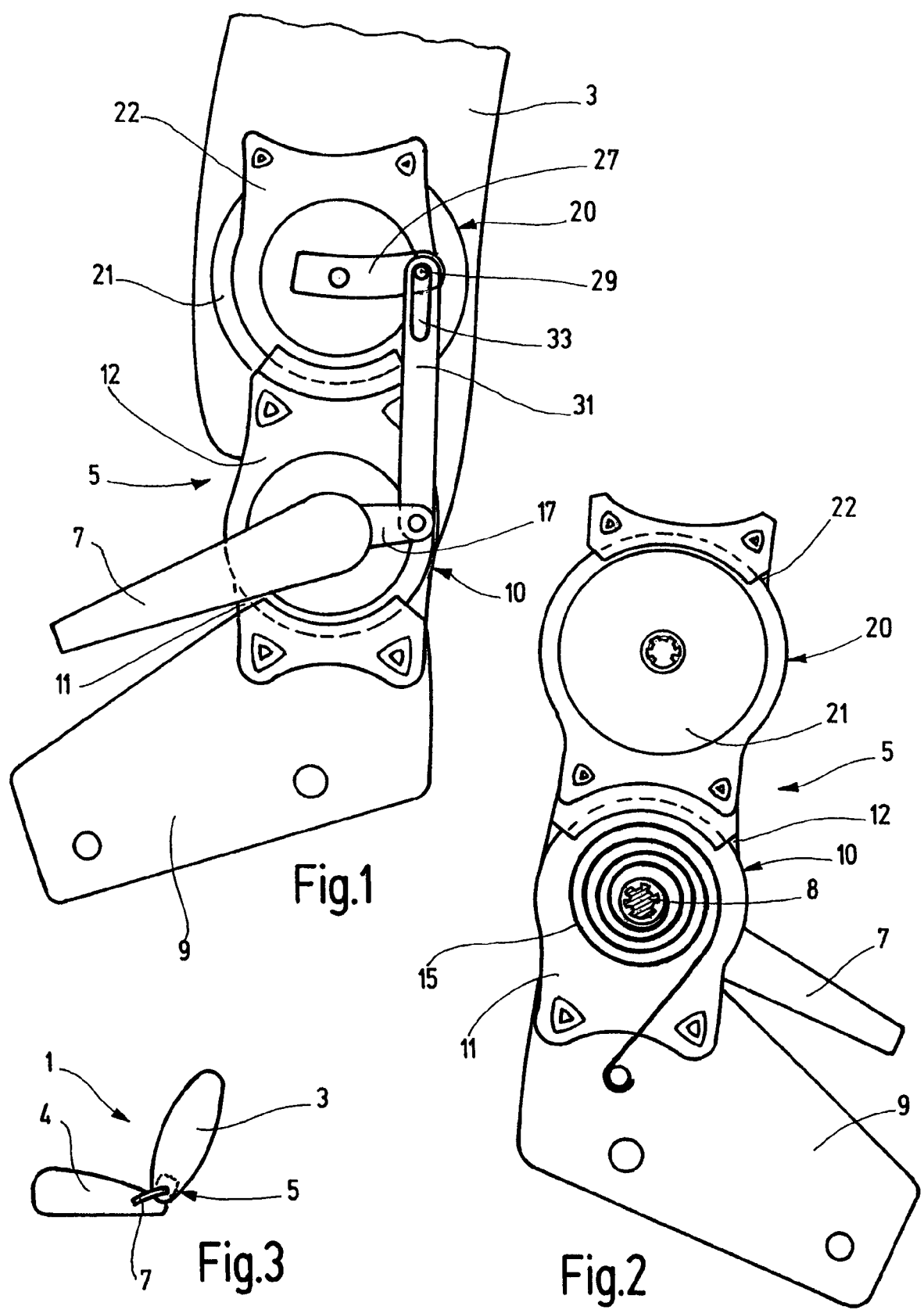

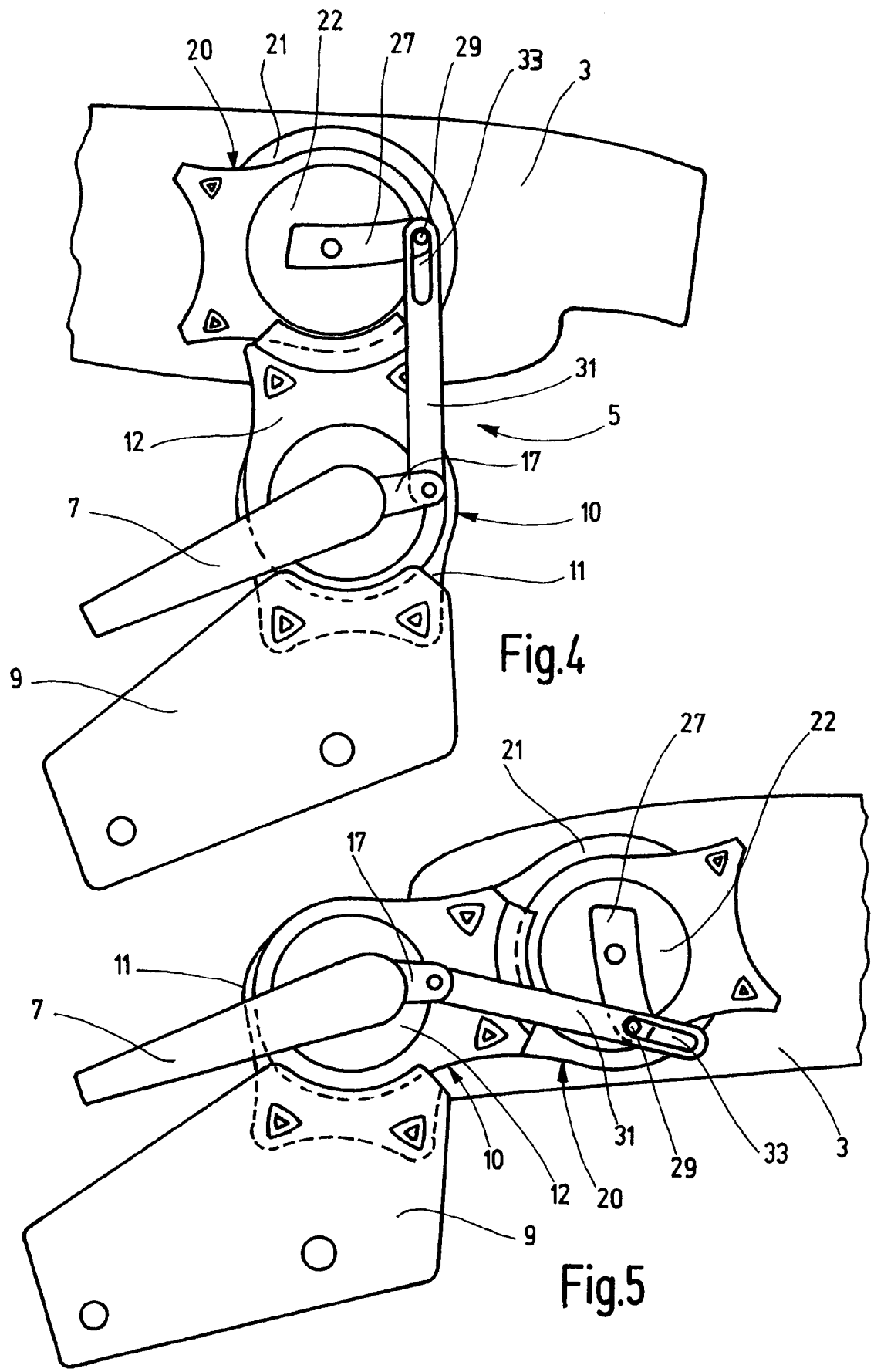

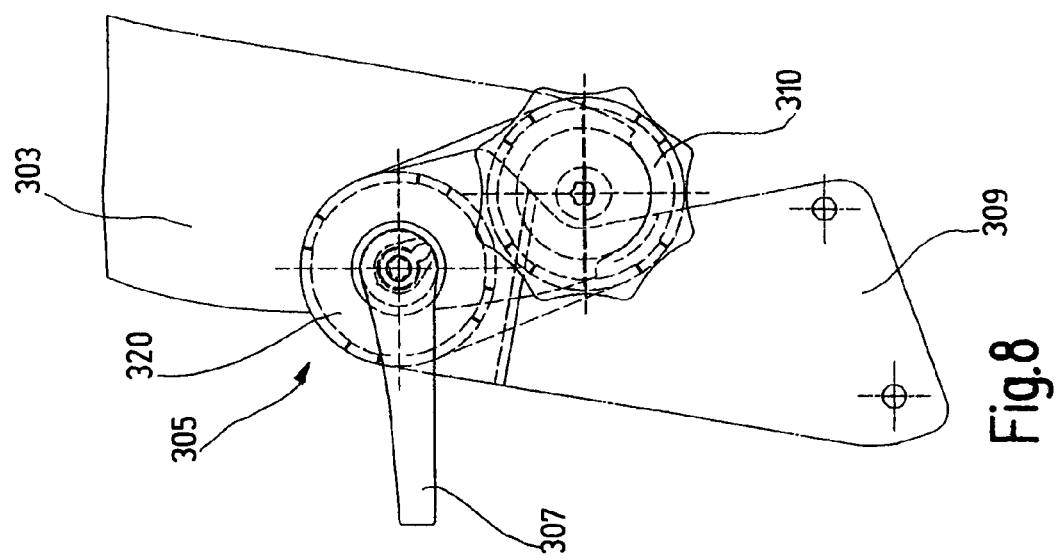
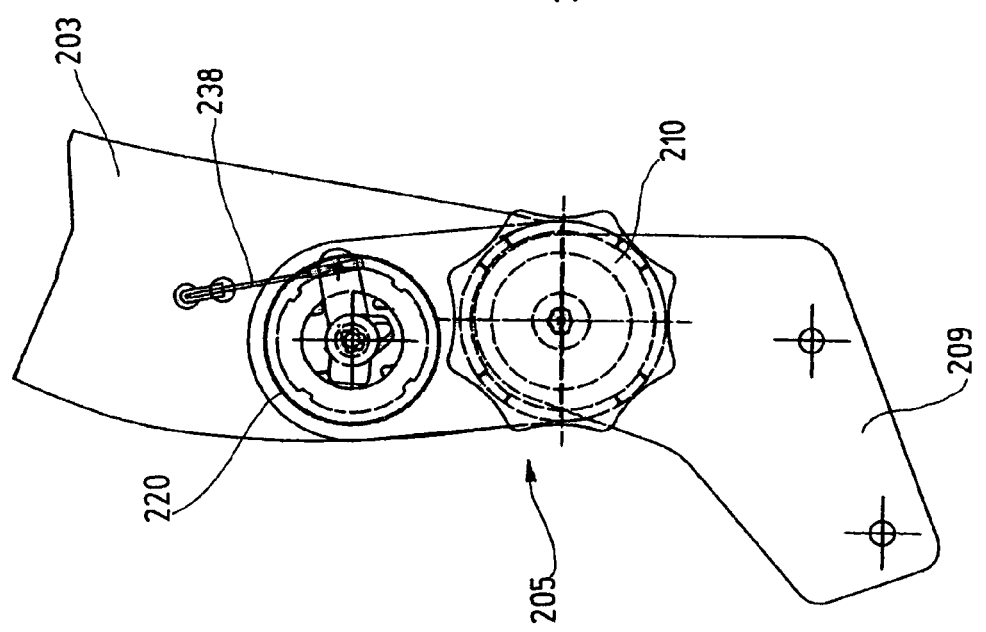
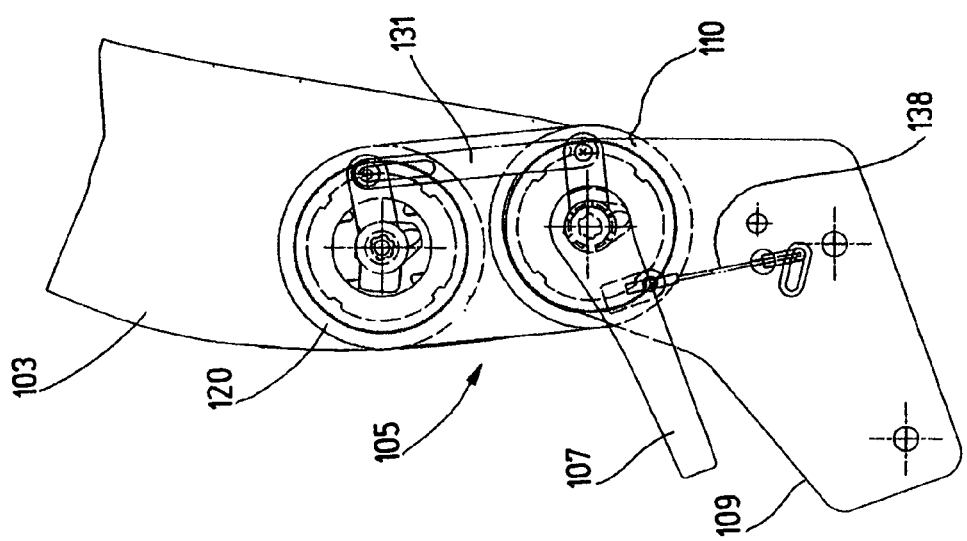

FITTING SYSTEM FOR A VEHICLE SEAT

CROSS-REFERENCE TO RELATED APPLICATION

The present application is a continuation of International Application PCT/EP04/02563, which was filed Mar. 12, 2004. The disclosure of International Application PCT/EP04/02563 is incorporated herein by reference, in its entirety.

BACKGROUND OF THE INVENTION

The present invention relates to a fitting system for a vehicle seat, in particular for a motor vehicle seat, wherein the fitting system is for adjusting the inclination of a backrest relative to a seat part of the vehicle seat; the fitting system has a first fitting and a second fitting arranged above and attached to the first fitting; after the first fitting has been unlocked, the backrest is adjustable between various upright use positions and/or between at least one upright use position and a rearward-inclined reclining position; and after the second fitting is unlocked, the backrest is adjustable between at least one upright use position and a forward-tilted table position.

DE 38 28 659 A1 discloses a fitting system of the type described immediately above. The fitting system of DE 38 28 659 A1 includes an adjustment fitting that is attached to the seat part of a vehicle seat. The adjustment fitting is an entirely functional first fitting, and is lockable in several steps by means of a ratchet. The fitting system of DE 38 28 659 A1 also includes a tilt fitting that is attached to the backrest of the vehicle seat. The tilt fitting is a simple second fitting that is mounted on the adjustment fitting and lockable in one position by means of a locking lever. Various use positions and one reclining position can be set by operating the adjustment fitting. When the adjustment fitting is unlocked and the backrest is pivoted forward until the frontmost use position is reached, and if no obstacle is in the way, the tilt fitting is automatically unlocked and the backrest can be tilted around a higher-situated axis of rotation into a table position. The adjustment fitting must be locked in order to avoid undefined movements.

BRIEF SUMMARY OF SOME ASPECTS OF THE INVENTION

An aspect of the present invention is the provision of improvements to a fitting system of the type described above. In accordance with an aspect of the present invention, a fitting system for a vehicle seat, in particular for a motor vehicle seat, can be used for adjusting the inclination of a backrest relative to a seat part, with the fitting system having a first fitting and a second fitting. The second fitting is arranged above, and is attached to, the first fitting. After the first fitting has been unlocked, the backrest is adjustable between various upright use positions and/or between at least one upright use position and a rearward-inclined reclining position. After the second fitting is unlocked, the backrest is adjustable between at least one upright use position and a forward-tilted table position. In accordance with an aspect of the present invention, the first fitting and the second fitting can be separately designed as entirely functional adjustment fittings.

Because the first fitting and the second fitting are separately designed as entirely functional adjustment fittings, a modular system is provided in which autonomous self-contained units, each of which is independently functional, and which for example automatically lock in several possible positions, can be combined with each other, with adapters being added, in accordance with the demands made on the fitting system and with the given geometrical conditions. The adjustment fittings may be designed as geared fittings or as detent fittings and may, for example, have a normal shape with adaptation tongues (e.g., adaptation flanges) and retaining plates, or they may be disc-shaped with adaptation protrusions. One or both fittings can be motor-driven, in which case the drive may be provided in the backrest or in the seat part. Transmission rods extending between both sides of the vehicle seat may engage in the center of the fittings or may be arranged to be offset therefrom.

In order to avoid undefined movements, the adjustment ranges of the first fitting and of the second fitting preferably adjoin and complete each other. The first fitting is preferably pre-tensioned against the limit position. Such pre-tensioning is not necessary for the second fitting due to both the force that the occupant exerts on the backrest and the weight of the backrest, which hold the second fitting in its limit position, but such pre-tensioning provisions could nevertheless be made.

If two detent fittings are provided, the first fitting and the second fitting are preferably simultaneously unlockable via a coupling means. This ensures that for each inclined position both the first and the second fitting are available for adjustment purposes, namely on both sides of the vehicle seat. If the tolerances or torsions in the transmission element between the two sides of the vehicle seat are too large, the interrogation technology of the state-of-the-art may create the problem that the second fitting unlocks only on one side or on neither side, once the area of the limit position is reached.

The first fitting is directly unlocked, for example, by a user-operated unlocking lever or by means of a component, such as a transmission rod or a Bowden cable, that is operatively connected thereto, each of which defines a first releasing means. Correspondingly, the second fitting is unlocked via the coupling by means of a second releasing means, and in a very simple second fitting a coupling of this kind may act directly as the second releasing means. A possibly necessary geometrical compensation when the backrest is inclined can be achieved by providing idle travel, driver systems or other uncoupling means, e.g. by providing a slot-and-pin-guide.

The fitting system according to the present invention can be used in principle for all types of vehicle seats having an adjustable backrest, but preferably it is suitable for motor vehicle seats whose backrests possess a table-tilt function and which require a higher-situated axis of rotation in order to avoid high pressure on the upholstery.

Other aspects and advantages of the present invention will become apparent from the following.

BRIEF DESCRIPTION OF THE DRAWINGS

The present invention is explained in greater detail below with reference to exemplary embodiments which are illustrated in the drawings, in which:

FIG. 1 shows a view of the outward-facing side of the first exemplary embodiment in the limit position, FIG. 2 shows a view of the inward-facing side of the first exemplary embodiment in the limit position, FIG. 3 is a diagrammatic view of a vehicle seat, FIG. 4 shows a view corresponding to FIG. 1 in the table position, FIG. 5 shows a view corresponding to FIG. 1 in the reclining position, FIG. 6 shows a view of the outward-facing side of the second exemplary embodiment in the limit position, FIG. 7 shows a view of the outward-facing side of the third exemplary embodiment in the limit position, and FIG. 8 shows a view of the outward-facing side of the fourth exemplary embodiment in the limit position.

DETAILED DESCRIPTION OF EXEMPLARY EMBODIMENTS

In the first exemplary embodiment, a backrest 3 on a seat 1 for a motor vehicle is adjustable in inclination relative to a seat part 4, as a result of which several substantially upright use positions can be defined for sitting purposes. In addition, the backrest 3 can be tilted forward into a table position and backwards into a reclining position. In the table position, the backrest's rear surface is arranged almost horizontally. In the reclining position, the backrest is inclined at an angle of about 75° relative to the vertical. For the purpose of this moving of the backrest 3, the vehicle seat 1 is provided on both sides with a fitting system 5. An unlocking lever 7 accessible to the user is provided on one of the otherwise mirror-inverted fitting systems 5 on one side of the vehicle seat 1. The two fitting systems 5 are operatively connected by means of a horizontal transmission rod 8 or a pull cable in order to permit synchronous unlocking. For the sake of simplicity, in the following only the fitting system 5 on the side with the unlocking lever 7 is described.

The fitting system 5 is attached at its lower end to an adapter 9 which is firmly connected with the structure of the seat part 4. The fitting system 5 comprises two separately formed assemblies. The first assembly consists of a first fitting 10 (backrest adjustment fitting) with a first lower fitting part 11 used to attach the fitting to the adapter 9, and a first upper fitting part 12 rotatable relative to the first lower fitting part 11 and lockable in various positions.

The entirely functional first fitting 10 functions according to a detent principle. That is, in the locked state of the first fitting 10, relative rotation is prevented by toothed segments whose teeth engage with the first upper fitting part 12. The toothed segments are movably mounted in the first lower fitting part 11 and are pre-tensioned radially outward via a spring-loaded eccentric disc. A first releasing means can be the unlocking lever 7. As the unlocking lever 7 is pivoted upward, the toothed segments are retracted radially inward, thereby releasing the first upper fitting part 12. The first fitting 10 on the other side of the vehicle seat is unlocked by means of rotating the transmission rod 8. The transmission rod 8 is rotationally fixed to the unlocking lever 7, and can be referred to as a second releasing means.

The adapter 9, which partially overlaps the first upper fitting part 12, serves as a retaining plate axially holding the first lower fitting part 11 and the first upper fitting part 12 together. A spiral-wound compensation spring 15 compensates for the weight of the backrest 3 by biasing the first upper fitting part 12 forward in the direction of travel. The outer end of the compensation spring 15 is supported on the adapter 9. The inner end of the compensation spring 15 is supported on the first upper fitting part 12. A rearward-projecting tongue (e.g., projecting flange) 17 is formed on the unlocking lever 7 for a coupling function which is described below.

The second assembly of the fitting system 5 consists of a second fitting 20 (backrest tilt fitting) which comprises a second lower fitting part 21 mounted on the first upper fitting part 12, and a second upper fitting part 22 which is rotatable relative to the second lower fitting part 21 and is lockable in at least two positions. The second upper fitting part 22 is rigidly connected with the structure of the backrest 3.

The two fittings 10 and 20 are of a normal shape (i.e. each lower fitting part 11 and 21 and each upper fitting part 12 and 22 is provided with two adaptation tongues (e.g., adaptation flanges) formed thereon for mutual attachment and for attachment to the adapter 9 and the backrest 3) and both fitting parts of a fitting are held together axially by retaining plates. When it is appropriately overlapped by the first upper fitting part 12, the second lower fitting part 21 can be designed as a retaining plate for axially holding the first fitting 10 together, while the first upper fitting part 12 can correspondingly serve as a retaining plate for axially holding the second fitting 20 together. It is possible, however, in each case to provide separate retaining plates.

The second fitting 20 is also formed as an entirely functional detent fitting which can be locked at least in one position in which both second fitting parts 21 and 22 are at a 180° angle with respect to one another, and also in a position in which both second fitting parts 21 and 22 are at a right angle to each other. The number of lockable positions can be defined by an insertable ring according to DE 199 28 148 A1 (which is a member of the same patent family as U.S. Pat. No. 6,454,354), the disclosure of which is explicitly incorporated herein by reference, in its entirety. A rotatably mounted release lever 27 is provided as a second releasing means for unlocking purposes. The release lever 27 carries a pin 29 at its free end, and is otherwise rotationally fixed to the eccentric disc of the second fitting 20.

In order to couple the unlocking process of the first fitting 10 and of the second fitting 20, an elongated coupling element 31 is provided. The upper end of the coupling element 31 defines a slot 33 that is in receipt of the pin 29. The lower end of the coupling element 31 is pivotably attached to the tongue 17.

By means of stops or appropriate configurations of the retaining plates, none of which are shown in detail here, the pivoting range of the first upper fitting part 12 is limited to the range between the reclining position and a limit position, whereby in this limit position, which at the same time marks the furthest forward use position, the first upper fitting part 12 is vertically oriented and tensioned against this forward stop by means of the compensation spring 15. The pivoting range of the second fitting 20 is correspondingly limited to the range between the limit position and the table position perpendicular thereto. The adjustment ranges of the first fitting 10 and of the second fitting 20 thus adjoin and complete each other.

For each change in the setting of the backrest 3, the unlocking lever 7 is operated, thereby unlocking the fitting system 5 as a whole, i.e. the first fitting 10 is unlocked directly, and the second fitting 20 is unlocked via the tongue 17, the coupling element 31 and the release lever 27. When adjusting the angle of inclination of the backrest 3 for sitting purposes, i.e. backwards from the limit position, and when making the transition to the recline position, only the setting of the first fitting 10 is modified, while the second fitting 20 is held against its rear stop by the force exerted by the occupant and by the weight of the backrest 3, as well as by the reactive force of the compensation spring 15. The slot-and-pin guide formed by the slot 33 in the coupling element 31 and the pin 29 on the release lever 27 compensates for the change in the geometrical conditions between the unlocking lever 7 and the release lever 27 in the flatter positions of the backrest 3 when the fitting 5 is again locked. The compensation spring 15 supports the return to more upright positions.

When the transition is made to the table position, the compensation spring 15 holds the first fitting 10 at its forward stop, while the second fitting 20 can be tilted forward and is locked when the table position is reached. The strength of the compensation spring 15 is such that when the seat returns to a use position, the second fitting 20 can first be tilted up to its rear stop before the first stop 10 pivots to the rear.

The second exemplary embodiment is the same as the first exemplary embodiment, except as otherwise described below, thus the similar and similarly acting components bear reference numbers raised by 100. The fitting system 105 of the second exemplary embodiment also contains an entirely functional first fitting 110 and an entirely functional second fitting 120. The first fitting 110 is firmly attached to the seat part by means of an adapter 109 for adjusting the backrest setting. The second fitting 120 is connected to the backrest 103 for tilting the backrest 103. As in the first exemplary embodiment, both fittings 110 and 120 are designed as detent fittings. The second fitting 120 is arranged above the first fitting 110 and is unlocked synchronously with the first fitting 110 by means of a coupling element 131 having a slot-and-pin guide. On one side of the vehicle seat, the first fitting 110 includes an unlocking lever 107. The coupling to the other side of the vehicle seat is accomplished via a pull cable 138. The second fitting 120 has a closed disc shape of the type described in DE 101 05 282 A1 (which is a member of the same patent family as U.S. Pat. No. 6,799,806), the disclosure of which is explicitly incorporated herein by reference, in its entirety, i.e. a pressed-on ring holds the two fitting parts together which are connected at their faces with the first fitting 110 and the backrest 103. The connection-relevant dimensions of the disc shape coincide with the normal shape described in the first exemplary embodiment, so that the disc shape and the normal shape are interchangeable.

The third exemplary embodiment is the same as the two other exemplary embodiments, except as otherwise described below, thus the similar and similarly acting components bear reference numbers raised by 200 or 100. The fitting system 205 of the third exemplary embodiment also comprises a first fitting 210 and a second fitting 220. The first fitting 210 is designed as an entirely functional geared fitting which is firmly connected by means of an adapter 209 to the seat part for adjusting the angle of inclination of the backrest. The second fitting 220 is designed as an entirely functional detent fitting connected to the backrest 203 for tilting the backrest. The second fitting 220 is arranged above the first fitting 210 and is unlocked, together with the corresponding second fitting 210 on the other side of the vehicle seat, by means of a cable pull 238. The synchronous actuation of the two first fittings 210 is accomplished by means of a transmission rod, which is not shown in detail here. A compensation spring is not provided because the first fitting 210 is self-locking. Both fittings 210 and 220 have the disc shape described above.

The fourth exemplary embodiment is the same as the third exemplary embodiment, except as otherwise described below, thus the similar and similarly acting components bear reference numbers raised by 100. In the fitting system 305 of the fourth exemplary embodiment, the entirely functional first fitting 310 is designed as a geared fitting and is connected to the backrest 303 for adjusting the angle of inclination of the backrest. The entirely functional second fitting 320 is arranged above and slightly in front of the first fitting 310. The second fitting 320 is designed as a detent fitting and is firmly attached by means of adapter 309 to the seat part. The second fitting 320 is for tilting the backrest. The axis of tilting is thus firmly attached to the seat part, in contrast to the other exemplary embodiments in which the axis of tilting is firmly attached to the backrest. The second fitting 320 is unlocked by means of an unlocking lever 307 on one side and by means of a transmission rod, not shown in further detail here, on the other side of the vehicle seat. The synchronous actuation of the two first fittings 310 is also accomplished via a transmission rod which is not shown in detail here. A compensation spring is again not needed. Both fittings 310 and 320 have the normal shape with retaining plates and adaptation tongues (e.g., adaptation flanges) formed thereon as described above.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A fitting system for adjusting inclination of a vehicle seat's backrest relative to the vehicle seat's seat part, the fitting system comprising:
   a first fitting and a second fitting, wherein
   (a) the second fitting is positioned above, and is attached to, the first fitting,
   (b) while the first fitting is unlocked, the first fitting is operative so that
      (1) the backrest is adjustable between upright use positions and/or
      (2) the backrest is adjustable between at least one upright use position and a rearward-inclined recline position,
   (c) the second fitting is operative so that the backrest is adjustable between at least one upright use position and a forward-tilted table position while the second fitting is unlocked,
   (d) the first fitting is an entirely functional adjustment fitting,
   (e) the second fitting is an entirely functional adjustment fitting,
   (f) the first fitting is a disc-shaped geared fitting, and
   (g) the second fitting is a disc-shaped detent fitting.

2. The fitting system according to claim 1, wherein:
   the first fitting has a range of adjustment,
   the second fitting has a range of adjustment, and
   the range of adjustment of the first fitting and the range of adjustment of the second fitting adjoin and complete each other.

3. The fitting system according to claim 2 in combination with the vehicle seat, wherein inclination of the vehicle seat's backrest can be adjusted relative to the vehicle seat's seat part via the fitting system.

4. The fitting system according to claim 2, wherein:
   the range of adjustment of the first fitting extends between a limit position and a reclining position,
   the limit position is a forwardmost use position, and the limit position is defined by a forward stop.

5. The fitting system according to claim 4, further comprising a coupling, wherein the first fitting and the second fitting are simultaneously unlockable via the coupling.

6. The fitting system according to claim 4 in combination with the vehicle seat, wherein inclination of the vehicle seat's backrest can be adjusted relative to the vehicle seat's seat part via the fitting system.

7. The fitting system according to claim 4, further comprising a compensation spring, wherein the compensation spring biases the first fitting against the forward stop.

8. The fitting system according to claim 7, wherein the second fitting's range of adjustment extends between the limit position and a table position.

9. The fitting system according to claim 4, wherein the second fitting's range of adjustment extends between the limit position and a table position.

10. The fitting system according to claim 1, further comprising a coupling, wherein the first fitting and the second fitting are simultaneously unlockable via the coupling.

11. The fitting system according to claim 1, further comprising:
   a first releasing means, wherein the first releasing means is for directly unlocking a fitting selected from the group consisting of the first fitting and the second fitting, and
   a second releasing means, wherein the second releasing means is operatively connected to the first releasing means for unlocking a fitting that is not directly unlocked by the first release means and is selected from the group consisting of the first fitting and the second fitting.

12. The fitting system according to claim 11, wherein the second releasing means comprises:
   a coupling element, and
   a slot-and-pin guide operatively associated with the coupling element for providing a geometrical compensation.

13. The fitting system according to claim 11 in combination with the vehicle seat, wherein inclination of the vehicle seat's backrest can be adjusted relative to the vehicle seat's seat part via the fitting system.

14. The fitting system according to claim 11, wherein the first releasing means comprises a pivotable unlocking lever.

15. The fitting system according to claim 11, wherein the second releasing means comprises a coupling element.

16. The fitting system according to claim 1, further comprising:
   a first releasing means for directly unlocking the second fitting, and
   a second releasing means for unlocking the first fitting in response to operation of the first releasing means.

17. The fitting system according to claim 1, further comprising:
   a first releasing means, wherein the first releasing means is for directly unlocking a fitting selected from the group consisting of the first fitting and the second fitting;
   a coupling; and
   a second releasing means, which is operatively connected to the first releasing means by the coupling, for unlocking a fitting that is not directly unlocked by the first release means and is selected from the group consisting of the first fitting and the second fitting.

18. The fitting system according to claim 1, further comprising:
   a lever for being pivoted and thereby unlocking the first fitting, and
   a coupling operatively connected to the lever and the second fitting so that pivoting of the lever also unlocks the second fitting.

19. The fitting system according to claim 18, wherein the coupling includes a slot-and-pin guide.

20. The fitting system according to claim 1 in combination with the vehicle seat, wherein inclination of the vehicle seat's backrest can be adjusted relative to the vehicle seat's seat part via the fitting system.

* * * * *